US012300173B2

(12) United States Patent
Yuan et al.

(10) Patent No.: US 12,300,173 B2
(45) Date of Patent: May 13, 2025

(54) PIXEL CIRCUIT, DISPLAY PANEL AND DISPLAY APPARATUS

(71) Applicants: Hefei BOE Joint Technology Co., Ltd., Anhui (CN); BOE TECHNOLOGY GROUP CO., LTD., Beijing (CN)

(72) Inventors: Zhidong Yuan, Beijing (CN); Yongqian Li, Beijing (CN)

(73) Assignees: Hefei BOE Joint Technology Co., Ltd., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/289,015

(22) PCT Filed: Jan. 19, 2023

(86) PCT No.: PCT/CN2023/073076
§ 371 (c)(1),
(2) Date: Oct. 31, 2023

(87) PCT Pub. No.: WO2024/152286
PCT Pub. Date: Jul. 25, 2024

(65) Prior Publication Data

US 2025/0078747 A1 Mar. 6, 2025

(51) Int. Cl.
*G09G 3/3233* (2016.01)
*G09G 3/32* (2016.01)
*G09G 3/3258* (2016.01)

(52) U.S. Cl.
CPC ............. *G09G 3/3233* (2013.01); *G09G 3/32* (2013.01); *G09G 3/3258* (2013.01);
(Continued)

(58) Field of Classification Search
CPC ...... G09G 3/3233; G09G 3/32; G09G 3/3258; G09G 2300/0819; G09G 2300/0852;
(Continued)

(56) References Cited

U.S. PATENT DOCUMENTS 10,818,230 B1 10/2020 Lu
11,011,113 B1 5/2021 Lu et al.
(Continued)

FOREIGN PATENT DOCUMENTS

CN 103236237 A 8/2013
CN 103413520 A 11/2013
(Continued)

*Primary Examiner* — Tom V Sheng
(74) *Attorney, Agent, or Firm* — HOUTTEMAN LAW LLC

(57) ABSTRACT

The present disclosure provides a pixel circuit, a display panel and a display apparatus, belongs to the field of display technology, and can solve a problem that a current time for compensating a threshold voltage is limited, and is easily affected by a sub-threshold voltage. The pixel circuit includes a reset sub-circuit, a data writing sub-circuit, a threshold compensation sub-circuit, a sub-threshold compensation sub-circuit, a driving transistor, a first storage capacitor, a first light emitting control sub-circuit, a second light emitting control sub-circuit and a light emitting device; the sub-threshold compensation sub-circuit is configured to store a voltage of a fourth node and compensate a sub-threshold of the driving transistor by using the voltage of the fourth node; the fourth node is a connection point between the sub-threshold compensation sub-circuit, a second electrode of the driving transistor, the data writing sub-circuit and the second light emitting control sub-circuit.

20 Claims, 5 Drawing Sheets

(52) U.S. Cl.
CPC ............... *G09G 2300/0819* (2013.01); *G09G 2300/0852* (2013.01); *G09G 2310/0262* (2013.01); *G09G 2310/08* (2013.01); *G09G 2320/0233* (2013.01); *G09G 2320/043* (2013.01); *G09G 2320/045* (2013.01)

(58) Field of Classification Search
CPC ....... G09G 2310/08; G09G 2310/0262; G09G 2320/043; G09G 2320/045; G09G 2320/0233
USPC .............................................................. 345/55
See application file for complete search history.

(56) References Cited

U.S. PATENT DOCUMENTS

| | | | | |
|---|---|---|---|---|
| 11,170,706 | B1 | 11/2021 | Lin et al. | |
| 11,322,087 | B1 * | 5/2022 | Beard | G09G 3/3233 |
| 12,183,262 | B2 * | 12/2024 | Yin | G09G 3/32 |
| 2014/0111503 | A1 * | 4/2014 | Kwon | G09G 3/3233 345/82 |
| 2015/0339974 | A1 | 11/2015 | Wu et al. | |
| 2016/0189610 | A1 * | 6/2016 | Xiao | G09G 3/3258 345/77 |
| 2018/0197458 | A1 * | 7/2018 | Xi | G09G 3/30 |
| 2019/0206320 | A1 * | 7/2019 | Nam | G09G 3/3258 |
| 2021/0201759 | A1 | 7/2021 | Cho et al. | |
| 2022/0076632 | A1 * | 3/2022 | Tang | G09G 3/3275 |
| 2022/0319417 | A1 * | 10/2022 | Liu | G09G 3/3233 |
| 2022/0343852 | A1 * | 10/2022 | Wang | G09G 3/3258 |
| 2023/0105200 | A1 * | 4/2023 | Zou | H10K 59/121 257/71 |
| 2024/0038162 | A1 * | 2/2024 | Yin | G09G 3/3233 |
| 2024/0144873 | A1 * | 5/2024 | Huang | H10K 59/131 |
| 2024/0194122 | A1 * | 6/2024 | Yin | G09G 3/3233 |

FOREIGN PATENT DOCUMENTS

| | | | |
|---|---|---|---|
| CN | 104167177 | A | 11/2014 |
| CN | 107230452 | A | 10/2017 |
| CN | 107767819 | A | 3/2018 |
| CN | 111754922 | A | 10/2020 |
| CN | 113674690 | A | 11/2021 |
| CN | 113744683 | A | 12/2021 |
| CN | 113851082 | A | 12/2021 |
| CN | 114120910 | A | 3/2022 |
| CN | 114220388 | A | 3/2022 |
| CN | 115223499 | A | 10/2022 |
| CN | 115376464 | A | 11/2022 |
| KR | 20190063625 | A | 6/2019 |

* cited by examiner

PIXEL CIRCUIT, DISPLAY PANEL AND DISPLAY APPARATUS

TECHNICAL FIELD

The present disclosure relates to the field of display technology, and particularly relates to a pixel circuit, a display panel and a display apparatus.

BACKGROUND

An organic light emitting diode (OLED) is a light emitting device using an organic solid semiconductor as a light emitting material, and under an action of an electric field, holes generated at an anode of the OLED and electrons generated at a cathode of the OLED move into a hole transport layer and an electron transport layer, respectively, and then migrate to a light emitting layer. The holes and the electrons meet at the light emitting layer, so that energy excitons are generated, thereby exciting light emitting molecules to finally generate visible light. LED display panels have advantages of simple preparation process, low cost, low power consumption, high brightness, wide working temperature application range and the like, and thus have a wide application prospect and are expected to become a mainstream of next generation display products.

SUMMARY

The present disclosure is directed to at least one problem in the existing art, and provides a pixel circuit, a display panel and a display apparatus.

In a first aspect, an embodiment of the present disclosure provides a pixel circuit, the pixel circuit includes: a reset sub-circuit, a data writing sub-circuit, a threshold compensation sub-circuit, a sub-threshold compensation sub-circuit, a driving transistor, a first storage capacitor, a first light emitting control sub-circuit, a second light emitting control sub-circuit and a light emitting device; the reset sub-circuit is configured to reset a voltage of a first node with an initialization signal in response to a first scan signal; the first node is a connection point between the reset sub-circuit, a first electrode of the light emitting device, an electrode of the first storage capacitor and a second electrode of the driving transistor; the data writing sub-circuit is configured to write a data signal into a second node in response to a second scan signal; the second node is a connection point between a control electrode of the driving transistor, the threshold compensation sub-circuit and another electrode of the first storage capacitor; the threshold compensation sub-circuit is configured to write a threshold compensation voltage into a third node in response to the first scan signal to compensate for a threshold of the driving transistor; the third node is a connection point between the threshold compensation sub-circuit, a first electrode of the driving transistor and the first light emitting control sub-circuit; the sub-threshold compensation sub-circuit is configured to store a voltage of a fourth node and compensate for a sub-threshold of the driving transistor by using the voltage of the fourth node; the fourth node is a connection point between the sub-threshold compensation sub-circuit, the second electrode of the driving transistor, the data writing sub-circuit and the second light emitting control sub-circuit; the first light emitting control sub-circuit is configured to write a first power voltage into the first electrode of the driving transistor in response to a first light emitting control signal to cause the driving transistor to generate a driving current; the second light emitting control sub-circuit is configured to transmit the driving current to the light emitting device in response to a second light emitting control signal, so that the light emitting device emits light.

In some implementations, the sub-threshold compensation sub-circuit includes a second storage capacitor, an electrode of the second storage capacitor is connected with the fourth node, and another electrode of the second storage capacitor is connected with the second node.

In some implementations, the sub-threshold compensation sub-circuit includes a second storage capacitor, an electrode of the second storage capacitor is connected with the fourth node, and another electrode of the second storage capacitor is connected with a second light emitting control signal line.

In some implementations, the sub-threshold compensation sub-circuit includes a second storage capacitor, an electrode of the second storage capacitor is connected with the fourth node, and another electrode of the second storage capacitor is connected with a first power voltage terminal or an initialization signal terminal.

In some implementations, a capacitance of the second storage capacitor is less than a capacitance of the first storage capacitor.

In some implementations, the capacitance of the second storage capacitor ranges from ⅕ to 1/10 of the capacitance of the first storage capacitor.

In some implementations, the reset sub-circuit includes a first transistor; a control electrode of the first transistor is connected with a first scan signal line, a first electrode of the first transistor is connected with an initialization signal terminal, and a second electrode of the first transistor is connected with the first node.

In some implementations, the data writing sub-circuit includes a second transistor; a control electrode of the second transistor is connected with a second scan signal line, a first electrode of the second transistor is connected with a data signal line, and a second electrode of the second transistor is connected with the fourth node.

In some implementations, the threshold compensation sub-circuit includes a third transistor; a control electrode of the third transistor is connected with a first scan signal line, a first electrode of the third transistor is connected with the second node, and a second electrode of the third transistor is connected with the third node.

In some implementations, the first light emitting control sub-circuit includes a fourth transistor; a control electrode of the fourth transistor is connected with a first light emitting control signal line, a first electrode of the fourth transistor is connected with a first power voltage terminal, and a second electrode of the fourth transistor is connected with the third node.

In some implementations, the second light emitting control sub-circuit includes a fifth transistor; a control electrode of the fifth transistor is connected with a second light emitting control signal line, a first electrode of the fifth transistor is connected with the fourth node, and a second electrode of the fifth transistor is connected with the first node.

In some implementations, a time duration of an operating level of the second scan signal is longer than a time duration of an operating level of the first scan signal.

In some implementations, a falling edge of the second scan signal is staggered from a rising edge of the second light emitting control signal.

In a second aspect, an embodiment of the present disclosure provides a display panel, the display panel includes a plurality of pixel circuits, and the pixel circuits include that provided as described above.

In some implementations, the pixel circuits are arranged in an array; and for the pixel circuits in an $n^{th}$ row, each first light emitting control sub-circuit is connected with an $n^{th}$ first light emitting control signal line, and each second light emitting control sub-circuit is connected with an $n^{th}$ second light emitting control signal line; n is an integer greater than 1.

In some implementations, the $(n-1)^{th}$ first light emitting control signal line is reused as the $n^{th}$ second light emitting control signal line.

In a third aspect, an embodiment of the present disclosure provides a display apparatus, the display apparatus includes the display panel provided as described above.

DETAILED DESCRIPTION

Figure 1:
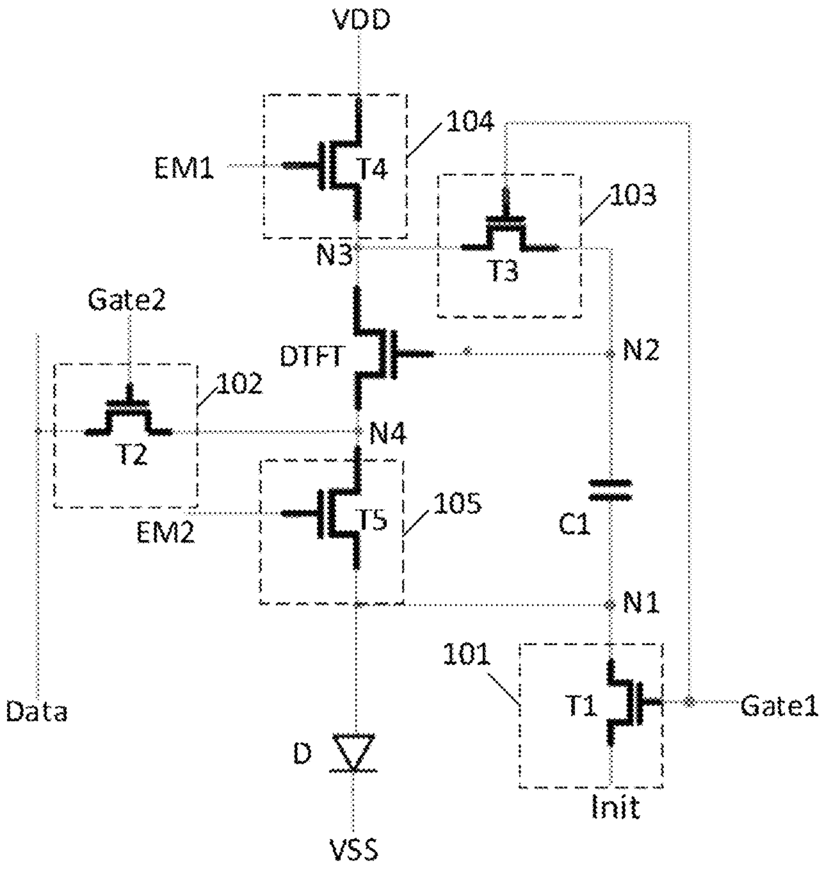
FIG. 1 is a schematic diagram of an exemplary pixel circuit.

In order that those skilled in the art will better understand the technical solutions of the present disclosure, the following detailed description is given with reference to the accompanying drawings and the specific embodiments.

Unless defined otherwise, technical or scientific terms used herein shall have the ordinary meaning as understood by one of ordinary skill in the art to which the present disclosure belongs. The use of "first," "second," and the like in the present disclosure is not intended to indicate any order, quantity, or importance, but rather is used to distinguish one element from another. Also, the use of the terms "a," "an," or "the" and similar referents does not denote a limitation of quantity, but rather denotes the presence of at least one. The word "comprising/including" or "comprise/include", and the like, means that the element or item preceding the word contains the element or item listed after the word and its equivalent, but does not exclude other elements or items. The terms "connected" or "coupled" and the like are not restricted to physical or mechanical connections, but may include electrical connections, whether direct or indirect. Terms "upper", "lower", "left", "right", and the like are used only to indicate relative positional relationships, and if the absolute position of the object being described is changed, the relative positional relationships may be changed accordingly.

It should be noted that, according to characteristics of transistors, the transistors may be divided into N-type transistors and P-type transistors, and for clarity, the embodiments of the present disclosure detail the technical solutions of the present disclosure by taking the transistors being N-type transistors (for example, N-type MOS transistors) as an example. However, the transistors in the embodiments of the present disclosure are not limited to N-type transistors, and one skilled in the art may also implement the functions of one or more transistors in the embodiments of the present disclosure by using P-type transistors (e.g., P-type MOS transistors) as desired.

The transistors used in the embodiments of the present disclosure may be thin film transistors or field effect transistors or other switching devices with the same characteristics, and the thin film transistors may include oxide semiconductor thin film transistors, amorphous silicon thin film transistors, polysilicon thin film transistors, or the like. For each transistor, it includes a first electrode, a second electrode and a control electrode; the control electrode is used as a control electrode of the transistor, one of the first electrode or the second electrode is used as a source electrode of the transistor, and the other one of the first electrode or the second electrode is used as a drain electrode of the transistor; the source electrode and the drain electrode of the transistor may be symmetrical in structure, so that there may be no difference therebetween in physical structure. In the embodiments of the present disclosure, in order to distinguish, except for a gate electrode serving as the control electrode, the first electrode is directly described as the source electrode, and the second electrode is directly described as the drain electrode, and thus the source electrode and the drain electrode of each of all or part of the transistors in the embodiments of the present disclosure may be interchanged as desired.

It should be understood that, since the transistors used in the embodiments of the present disclosure are P-type transistors, an operating level corresponds to a low level, and a high level corresponds to a non-operating level.

In addition, the light emitting device in the embodiments of the present disclosure may be a light emitting diode, and further, may be a current-type light emitting diode, such as an organic light emitting diode (OLED), a micro light emitting diode (Micro-LED), or a mini light emitting diode (Mini-LED), and certainly, the light emitting device in the embodiments of the present disclosure may be the organic light emitting diode (OLED). One of the first electrode or the second electrode of the light emitting device is an anode, and the other one of the first electrode and the second electrode of the light emitting device is a cathode; in the embodiments of the present disclosure, the first electrode of the light emitting device is taken as the anode, and the second electrode of the light emitting device is taken as the cathode.

FIG. 1 is a schematic structural diagram of an exemplary pixel circuit, as shown in FIG. 1, the pixel circuit includes a reset sub-circuit 101, a data writing sub-circuit 102, a threshold compensation sub-circuit 103, a driving transistor DTFT, a first storage capacitor C1, a first light emitting control sub-circuit 104, a second light emitting control sub-circuit 105, and a light emitting device D.

The reset sub-circuit 101 is configured to reset a voltage of a first node N1 with an initialization signal in response to a first scan signal; the first node N1 is a connection point between the reset sub-circuit 101, an anode of the light emitting device D, an electrode of the first storage capacitor C1, and a drain electrode of the driving transistor DTFT. The data writing sub-circuit 102 is configured to write a data signal to a second node N2 in response to a second scan signal; the second node N2 is a connection point between a gate electrode of the driving transistor DTFT, the threshold compensation sub-circuit 103, and another electrode of the first storage capacitor C1. The threshold compensation sub-circuit 103 is configured to write a threshold compensation voltage into a third node N3 in response to the first scan signal to compensate for a threshold of the driving transistor DTFT; the third node N3 is a connection point between the threshold compensation sub-circuit 103, a source electrode of the driving transistor DTFT, and the first light emitting control sub-circuit 104. The first light emitting control sub-circuit 104 is configured to write a first power voltage into the source electrode of the driving transistor DTFT in response to a first light emitting control signal to cause the driving transistor DTFT to generate a driving current and transmit the driving current to a fourth node N4; the fourth node N4 is a connection point between the drain electrode of the driving transistor DTFT, the data writing sub-circuit 102, and the second light emitting control sub-circuit 105. The second light emitting control sub-circuit 105 is configured to transmit the driving current to the light emitting device D in response to a second light emitting control signal, so that the light emitting device D emits light.

In some implementations, continuing reference may be made to FIG. 1, the reset sub-circuit 101 includes a first transistor T1; the first transistor T1 has a gate electrode connected to a first scan signal line Gate1, a source electrode connected to an initialization signal terminal Init, and a drain electrode connected to the first node N1. The data writing sub-circuit 102 includes a second transistor T2; a gate electrode of the second transistor T2 is connected to a second scan signal line Gate2, a source electrode of the second transistor T2 is connected to a data signal line Data, and a drain electrode of the second transistor T2 is connected to the fourth node N4. The threshold compensation sub-circuit 103 includes a third transistor T3; the third transistor T3 has a gate electrode connected to the first scan signal line Gate1, a source electrode connected to the second node N2, and a drain electrode connected to the third node N3. The first light emitting control sub-circuit 104 includes a fourth transistor T4; the fourth transistor T4 has a gate electrode connected to a first light emitting control signal line EM1, a source electrode connected to a first power voltage terminal VDD, and a drain electrode connected to the third node N3. The second light emitting control sub-circuit 105 includes a fifth transistor T5; the fifth transistor T5 has a gate electrode connected to a second light emitting control signal line EM2, a source electrode connected to the fourth node N4, and a drain electrode connected to the first node N1. The light emitting device D has the anode connected to the first node N1 and a cathode connected to a second power voltage terminal VSS. The first storage capacitor C1 has an electrode connected to the first node N1 and another electrode connected to the second node N2.

For example, one of the first power voltage terminal VDD or the second power voltage terminal VSS is connected to a high voltage terminal, and the other one of the first power voltage terminal VDD or the second power voltage terminal VSS is connected to a low voltage terminal. For example, the first power voltage terminal VDD is a high voltage source to output a constant first voltage, the first voltage being a positive voltage; and the second power voltage terminal VSS may be a low voltage source to output a constant second voltage, the second voltage being a negative voltage, or the like. In some examples, the second power voltage terminal VSS may be grounded.

Figure 2:
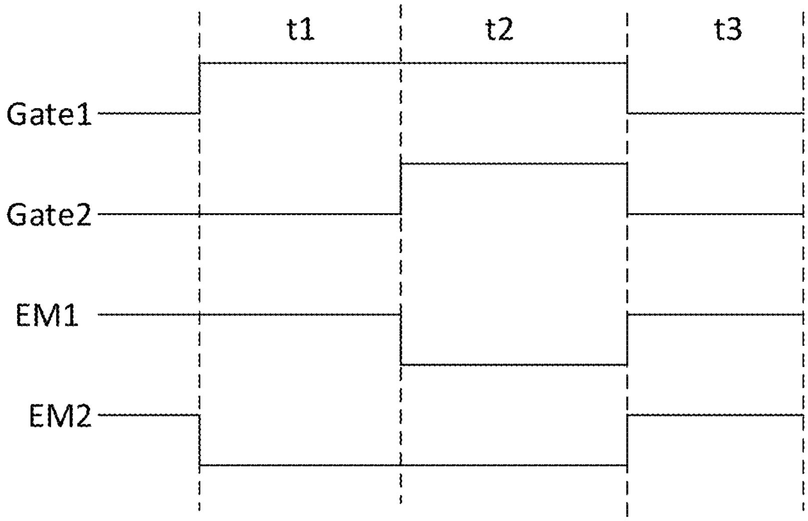
FIG. 2 is a timing diagram of the pixel circuit shown in FIG. 1.

FIG. 2 is a timing diagram of the pixel circuit shown in FIG. 1, and the operation of the pixel circuit shown in FIG. 1 will be further described with reference to FIG. 2. As shown in FIG. 2, an entire driving process of the pixel circuit can be divided into three stages, i.e., a first stage t1 called a reset stage, a second stage t2 including a data writing stage and a threshold compensation stage, and a third stage t3 called a light emitting stage.

With continued reference to FIG. 2, in the first stage t1, the first scan signal is a high level signal, the first transistor T1 and the third transistor T3 are turned on, the second scan signal is a low level signal, the second transistor T2 is turned off, the second node N2 and the third node N3 are connected together, and since the first light emitting control signal is a high level signal, the fourth transistor T4 is turned on, a voltage at the second node N2 and the third node N3 is raised to the first power voltage. In this case, the second light emitting control signal is a low level signal, the fifth transistor T5 is turned off, the first node N1 and the fourth node N4 are disconnected from each other, and the first node N1 is reset to the initialization signal. Generally, a voltage of the initialization signal may be equal to 0V.

In the second stage t2, the second scan signal is a high level signal, the second transistor T2 is turned on, and the data signal is written into the fourth node N4. The first scan signal continues to be a high level signal, and the first node N1 is reset to 0V. The first and second light emitting control signals are both low level signals, and the data signal is written into the second node N2, i.e., the gate electrode of the driving transistor DTFT. The second node N2 and the third node N3 discharge to the fourth node N4.

In the third stage t3, the first light emitting control signal and the second light emitting control signal are both high level signals, the fourth transistor T4 and the fifth transistor T are both turned on, and the fourth node N4 discharges to the first node N1, that is, a voltage of the anode of the light emitting device D is raised. Since the second power voltage terminal VSS connected to the cathode of the light emitting device D provides a low level signal, the anode of the light emitting device D discharges to the cathode, so that a driving current passes through the light emitting device D to drive the light emitting device D to emit light.

In the driving process of the pixel circuit, four gate signal lines are desired for driving, moreover, a time duration of compensating for the threshold of the driving transistor DTFT is consistent with a time duration of the data writing stage t2, since a time duration of the high level of the second scan signal is relatively short, the time duration of compensating for the threshold of the driving transistor DTFT is limited by the time duration of the operating level of the second scan signal, which is not beneficial to repeating compensation of a threshold voltage Vth of the driving transistor DTFT, especially in a display product with a relatively high refresh rate and a relatively high resolution, the time duration of compensating the threshold of the driving transistor DTFT is relatively short and cannot meet display expectations, so that a final voltage of the third node N3 and the second node N2 is close to Vdata+Vth, but is not equal to Vdata+Vth, which affects an effect of displaying.

In order to solve at least one of above technical problems, embodiments of the present disclosure provide a pixel circuit, a display panel and a display apparatus, and the pixel circuit, the display panel and the display apparatus provided in the embodiments of the present disclosure are described in further detail below with reference to the accompanying drawings and specific implementations.

Figure 3:
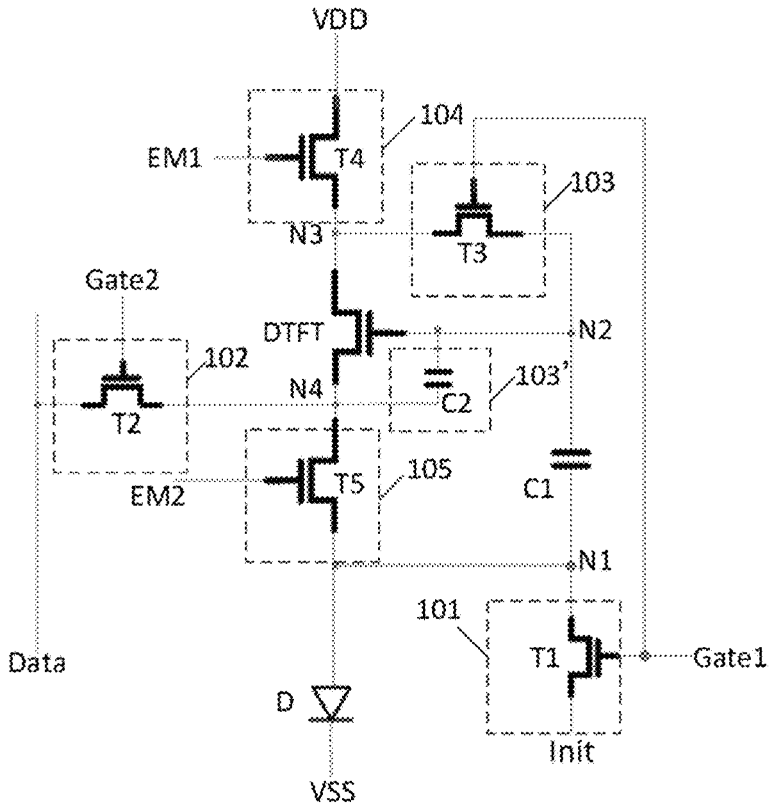
FIG. 3 is a schematic structural diagram of a pixel circuit according to an embodiment of the present disclosure.

In a first aspect, an embodiment of the present disclosure provides a pixel circuit, and FIG. 3 is a schematic structural diagram of a pixel circuit according to the embodiment of the present disclosure, as shown in FIG. 3, the pixel circuit includes a reset sub-circuit 101, a data writing sub-circuit 102, a threshold compensation sub-circuit 103, a sub-threshold compensation sub-circuit 103', a driving transistor DTFT, a first storage capacitor C1, a first light emitting control sub-circuit 104, a second light emitting control sub-circuit 105, and a light emitting device D.

The reset sub-circuit 101 is configured to reset a voltage of a first node N1 with an initialization signal in response to a first scan signal; the first node N1 is a connection point between the reset sub-circuit 101, an anode of the light emitting device D, an electrode of the first storage capacitor C1, and a drain electrode of the driving transistor DTFT. The data writing sub-circuit 102 is configured to write a data signal into a second node N2 in response to a second scan signal; the second node N2 is a connection point between a gate electrode of the driving transistor DTFT, the threshold compensation sub-circuit 103, and another electrode of the first storage capacitor C1. The threshold compensation sub-circuit 103 is configured to write a threshold compensation voltage into a third node N3 in response to the first scan signal to compensate for a threshold of the driving transistor DTFT; the third node N3 is a connection point between the threshold compensation sub-circuit 103, a source electrode of the driving transistor DTFT, and the first light emitting control sub-circuit 104. The sub-threshold compensation sub-circuit 103' is configured to store a voltage of a fourth node N4 and compensate for a sub-threshold of the driving transistor DTFT by using a voltage of the fourth node N4; the fourth node N4 is a connection point between the sub-threshold compensation sub-circuit 103', a drain electrode of the driving transistor DTFT, the data writing sub-circuit 102, and the second light emitting control sub-circuit 105. The first light emitting control sub-circuit 104 is configured to write a first power voltage into the source electrode of the driving transistor DTFT in response to a first light emitting control signal to cause the driving transistor DTFT to generate a driving current. The second light emitting control sub-circuit 105 is configured to transmit the driving current to the light emitting device D in response to a second light emitting control signal, so that the light emitting device D emits light.

In the pixel circuit provided by the embodiment of the present disclosure, the sub-threshold compensation sub-circuit 103' can store the voltage of the fourth node N4, and compensate for the sub-threshold of the driving transistor DTFT by using the voltage of the fourth node N4, and a time duration of compensating is not limited by the second scan signal, so that a time duration of compensating for the threshold of the driving transistor DTFT can be prolonged, and an effect of compensating for the threshold can be improved, thereby satisfying expectations on compensating for the threshold in the display product with a relatively high refresh rate and a relatively high resolution, and further improving the effect of displaying. Moreover, the sub-threshold compensation sub-circuit 103' can compensate for the sub-threshold of the driving transistor DTFT, so that the final voltage of the third node N3 and the second node N2 is equal to Vdata+Vth, and an influence of a threshold voltage and a sub-threshold voltage of the driving transistor DTFT on the driving current is avoided, thereby further improving the effect of displaying.

In some implementations, as shown in FIG. 3, the sub-threshold compensation sub-circuit 103' includes a second storage capacitor C2; an electrode of the second storage capacitor C2 is connected to the fourth node N4, and another electrode of the second storage capacitor C2 is connected to the second node N2.

In response to that the first scan signal is at a high level and the second scan signal is at a low level, due to an existence of the second storage capacitor C2, a potential of the fourth node N4 can be temporarily maintained as the data signal Vdata, and due to an existence of the first storage capacitor C1, potentials of the second node N2 and the third node N3 can be maintained at the voltage at the previous stage. Since the first scan signal is still a high level signal, a gate-source voltage Vgs of the driving transistor DTFT is close to the threshold voltage Vth, but is not equal to the threshold voltage Vth, and in this case, a sub-threshold current of the driving transistor DTFT exists. The sub-threshold current can cause voltages of the second node N2 and the third node N3 to continue to approach Vdata+Vth to eventually reach Vdata+Vth-ΔVss. A value of ΔVss here is mainly influenced by a sub-threshold current of a transistor in the data writing sub-circuit 102, and depends on a sub-threshold swing ΔSS of the transistor in the data writing sub-circuit 102 (ΔVss is generally at an mV level). Finally, a voltage difference across two electrodes of the first storage capacitor C1 is equal to Vdata+Vth-ΔVss-Vinit. Due to a coupling effect between the voltage of the fourth node N4 and the voltage of the second node N2, during the time duration of compensating for the sub-threshold, such voltages are slowly raised, and the precision of compensating is not influenced. The time duration of compensating for the threshold cannot be limited by the second scan signal, so that the time duration of compensating for the threshold of the driving transistor DTFT can be prolonged, the effect of compensating the threshold is improved, the expectations on compensating for the threshold in the display product with a relatively high refresh rate and a relatively high resolution are met, and the effect of displaying is improved. Furthermore, the influence of the threshold voltage and the sub-threshold voltage of the driving transistor on the driving current is avoided, so that the effect of displaying is further improved.

In some implementations, continuing reference may be made to FIG. 3, the reset sub-circuit 101 includes a first transistor T1; the first transistor T1 has a gate electrode connected to a first scan signal line Gate1, a source electrode connected to an initialization signal terminal Init, and a drain electrode connected to the first node N1. The data writing sub-circuit 102 includes a second transistor T2; a gate electrode of the second transistor T2 is connected to a second scan signal line Gate2, a source electrode of the second transistor T2 is connected to a data signal line Data, and a drain electrode of the second transistor T2 is connected to the fourth node N4. The threshold compensation sub-circuit 103 includes a third transistor T3; the third transistor T3 has a gate electrode connected to the first scan signal line Gate1, a source electrode connected to the second node N2, and a drain electrode connected to the third node N3. The first light emitting control sub-circuit 104 includes a fourth transistor T4; the fourth transistor T4 has a gate electrode connected to a first light emitting control signal line EM1, a source electrode connected to a first power voltage terminal VDD, and a drain electrode connected to the third node N3. The second light emitting control sub-circuit 105 includes a fifth transistor T5; the fifth transistor T5 has a gate electrode connected to a second light emitting control signal line EM2, a source electrode connected to the fourth node N4, and a drain electrode connected to the first node N1. The light emitting device D has an anode connected to the first node N1 and a cathode connected to a second power voltage terminal VSS. The first storage capacitor C1 has an electrode connected to the first node N1 and another electrode connected to the second node N2.

Figure 4:
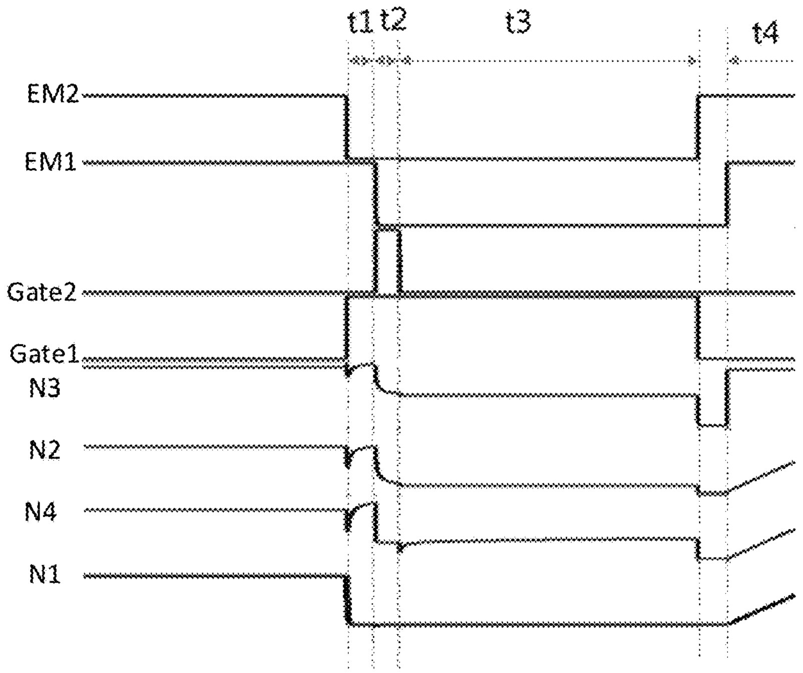
FIG. 4 is a timing diagram of the pixel circuit shown in FIG. 3.

FIG. 4 is a timing diagram of the pixel circuit shown in FIG. 3, and the operation of the pixel circuit shown in FIG. 3 will be further described with reference to FIG. 4. As shown in FIG. 4, the entire driving process of the pixel circuit can be divided into four stages, i.e., a first stage t1 called a reset stage, a second stage t2 including a data writing stage and a threshold compensation stage, a third stage t3 called a sub-threshold compensation stage, and a fourth stage t4 called a light emitting stage.

With continued reference to FIG. 4, in the first stage t1, the first scan signal is a high level signal, the first transistor T1 and the third transistor T3 are turned on, the second scan signal is a low level signal, the second transistor T2 is turned off, the second node N2 and the third node N3 are connected together, and since the first light emitting control signal is a high level signal, the fourth transistor T4 is turned on, a voltage of the second node N2 and the third node N3 is raised to the first power voltage. In this case, the second light emitting control signal is a low level signal, the fifth transistor T5 is turned off, the first node N1 and the fourth node N4 are disconnected from each other, and the first node N1 is reset to the initialization signal. Generally, the voltage of the initialization signal may be equal to 0V.

In the second stage t2, the second scan signal is a high level signal, the second transistor T2 is turned on, and the data signal is written into the fourth node N4. The first scan signal continues to be a high level signal, and the first node N1 is reset to 0V. The first and second light emitting control signals are both low level signals, and the data signal is written into the second node N2, i.e., the gate electrode of the driving transistor DTFT. The second node N2 and the third node N3 discharges to the fourth node N4.

In the third stage t3, in response to that the first scan signal is at a high level and the second scan signal is at a low level, the potential of the fourth node N4 may be temporarily maintained as the data signal Vdata due to the existence of the second storage capacitor C2, and the potentials of the second node N2 and the third node N3 may be maintained at the voltage at the previous stage due to the existence of the first storage capacitor C1. Since the first scan signal is still a high level signal, the gate-source voltage Vgs of the driving transistor DTFT is close to the threshold voltage Vth thereof, but is not equal to the threshold voltage Vth, and in this case, a sub-threshold current of the driving transistor DTFT exists. The sub-threshold current can cause the voltages of the second node N2 and the third node N3 to continue to approach Vdata+Vth to eventually reach Vdata+Vth-ΔVss. The value of Δ Vss here is mainly influenced by the sub-threshold current of the transistor in the data writing sub-circuit 102, and depends on the sub-threshold swing ΔSS of the transistor in the data writing sub-circuit 102 (ΔVss is generally at the mV level). Finally, the voltage difference across the two electrodes of the first storage capacitor C1 is equal to Vdata+Vth-ΔVss-Vinit. Due to the coupling effect between the voltage of the fourth node N4 and the voltage of the second node N2, the voltages are slowly raised during the time duration of compensating for the sub-threshold of the driving transistor, and the precision of compensating is not influenced.

In the fourth stage t4, the first light emitting control signal and the second light emitting control signal are both high level signals, the fourth transistor T4 and the fifth transistor T5 are both turned on, and the fourth node N4 discharges to the first node N1, that is, the voltage of the anode of the light emitting device D is raised. Since the second power voltage terminal VSS connected to the cathode of the light emitting device D provides a low level signal, the anode of the light emitting device D discharges to the cathode, so that a driving current passes through the light emitting device D to drive the light emitting device D to emit light.

In some implementations, a capacitance of the second storage capacitor C2 is less than a capacitance of the first storage capacitor C1. For example, the capacitance of the second storage capacitor C2 ranges from 1/5 to 1/10 of the capacitance of the first storage capacitor C1.

In the third stage t3, in most of the time duration of compensating, the compensating is performed by the sub-threshold current of the driving transistor DTFT, the capacitance of the second storage capacitor C2 is not desired to be very large, generally is desired to be about 20f, and can be adjusted according to a pixel density, and the capacitance of the second storage capacitor C2 can be usually set to be equal to a value ranging from 1/5 to 1/10 of the capacitance of the first storage capacitor C1.

Figure 5:
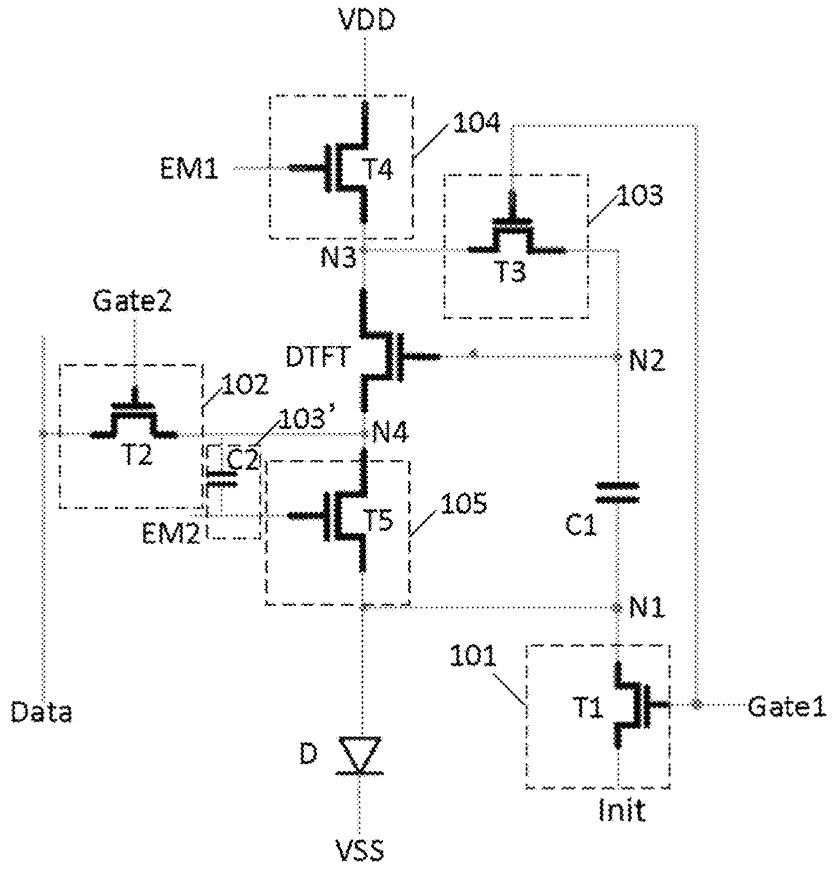
FIG. 5 is a schematic structural diagram of another pixel circuit according to an embodiment of the present disclosure.

FIG. 5 is a schematic structural diagram of another pixel circuit according to the embodiment of the present disclosure, and a difference between the pixel circuit shown in FIG. 5 and the pixel circuit shown in FIG. 3 is that, the sub-threshold compensation sub-circuit 103' shown in FIG. 5 includes a second storage capacitor C2; an electrode of the second storage capacitor C2 is connected to the fourth node N4, and another electrode of the second storage capacitor C2 is connected to the second light emitting control signal line EM2.

Figure 6:
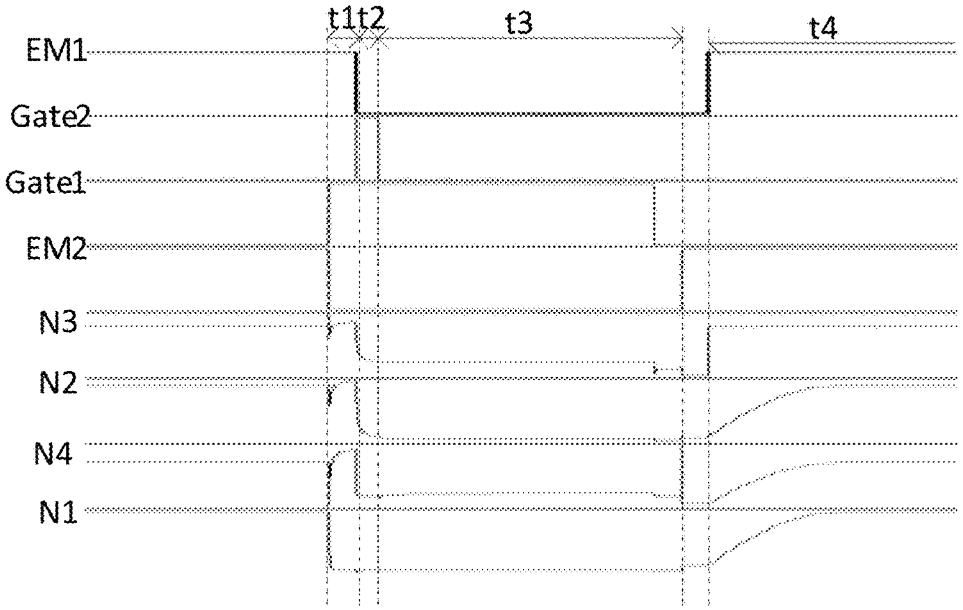
FIG. 6 is a timing diagram of the pixel circuit shown in FIG. 5.

FIG. 6 is a timing diagram of the pixel circuit shown in FIG. 5, and in the driving process of the pixel circuit, the first stage t1, the second stage t2 and the fourth stage t4 are the same as those in the driving process of the pixel circuit in FIG. 3, and thus detailed description thereof is omitted here.

As shown in FIG. 6, in the third stage t3, in response to that the first scan signal is at a high level and the second scan signal is at a low level, the potential of the fourth node N4 can be temporarily maintained as the data signal Vdata due to the existence of the second storage capacitor C2, and the potentials of the second node N2 and the third node N3 can be maintained at the voltage at the previous stage due to the existence of the first storage capacitor C1. Since the first scan signal is still a high level signal, the gate-source voltage Vgs of the driving transistor DTFT is close to the threshold voltage Vth thereof, but is not equal to the threshold voltage Vth, and in this case, a sub-threshold current of the driving transistor DTFT exists. Since an electrode of the second storage capacitor C2 is connected to the fourth node N4 and another electrode of the second storage capacitor C2 is connected to the second light emitting control signal line EM2, the sub-threshold current can cause the voltage of the third node N3 to continue to approach Vdata+Vth to finally reach Vdata+Vth-ΔVss. The value of ΔVss here is mainly influenced by the sub-threshold current of the transistor in the data writing sub-circuit 102, and depends on the sub-threshold swing ΔSS of the transistor in the data writing sub-circuit 102 (ΔVss is generally at the mV level). Finally, the voltage difference across the two electrodes of the first storage capacitor C1 is equal to Vdata+Vth-ΔVss-Vinit. Due to a coupling effect between the voltage of the fourth node N4 and the voltage of the second light emitting control signal line EM2 (the voltage of the second light emitting control signal line EM2 continues to be at a low level), the voltages are slowly raised during the time duration of compensating for the sub-threshold of the driving transistor, and the precision of compensating is not affected.

In some implementations, a falling edge of the second scan signal is staggered from a rising edge of the second light emitting control signal.

It should be noted that a start time of the falling edge of the second scan signal is earlier than a start time of the rising edge of the second light emitting control signal, so that the falling edge of the second scan signal is staggered from the rising edge of the second light emitting control signal, the second light emitting control signal can be maintained as a low level signal for a relatively long time at the third stage t3, so as to be coupled with the voltage of the fourth node N4, and avoid the second light emitting control signal, during falling, from affecting the voltage of the fourth node N4.

Figure 7:
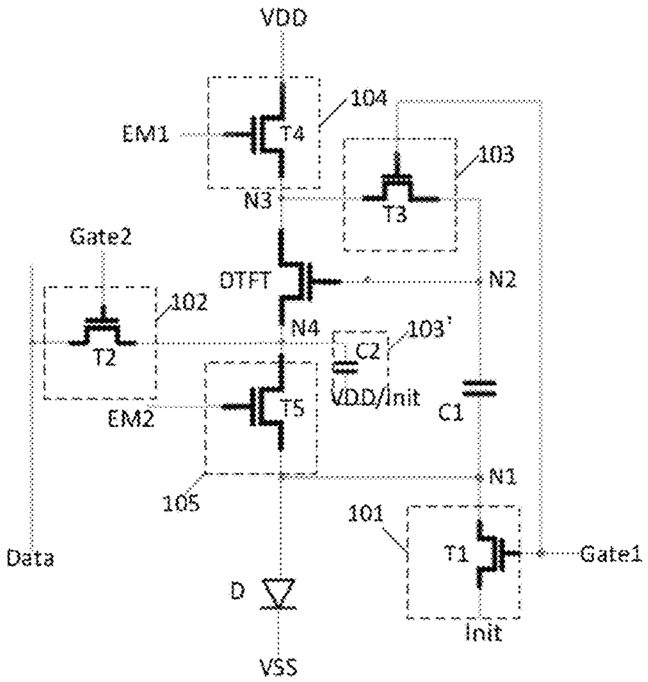
FIG. 7 is a schematic structural diagram of another pixel circuit according to an embodiment of the present disclosure.

FIG. 7 is a schematic structural diagram of another pixel circuit according to an embodiment of the present disclosure, and a difference between the pixel circuit shown in FIG. 7 and the pixel circuit shown in FIG. 3 is that the sub-threshold compensation sub-circuit 103' shown in FIG. 7 includes a second storage capacitor C2; an electrode of the second storage capacitor C2 is connected to the fourth node N4, and another electrode of the second storage capacitor C2 is connected to the first power voltage terminal VDD or the initialization signal terminal Init.

The timing diagram of the pixel circuit shown in FIG. 7 may refer to the timing diagram shown in FIG. 4 or FIG. 6, as shown in FIG. 4 or FIG. 6, in the driving process of the pixel circuit, the first stage t1, the second stage t2 and the fourth stage t4 are all the same as those in the driving process of the pixel circuit shown in FIG. 3, and detailed description thereof is omitted here. In the third stage t3, in response to that the first scan signal is at a high level and the second scan signal is at a low level, the potential of the fourth node N4 can be temporarily maintained as the data signal Vdata due to the existence of the second storage capacitor C2, and the potentials of the second node N2 and the third node N3 can be maintained at the voltage at the previous stage due to the existence of the first storage capacitor C1. Since the first scan signal is still a high level signal, the gate-source voltage Vgs of the driving transistor DTFT is close to the threshold voltage Vth of the driving transistor, but is not equal to the threshold voltage Vth, and in this case, a sub-threshold current of the driving transistor DTFT exists. Since an electrode of the second storage capacitor C2 is connected to the fourth node N4 and another electrode of the second storage capacitor C2 is connected to the first power voltage terminal VDD or the initialization signal terminal Init, the sub-threshold current can cause the voltage of the third node N3 to continue to approach Vdata+Vth to finally reach Vdata+Vth-ΔVss. The value of ΔVss here is mainly influenced by the sub-threshold current of the transistor in the data writing sub-circuit 102, and depends on the sub-threshold swing ΔSS of the transistor in the data writing sub-circuit 102 (ΔVss is generally at the mV level). Finally, the voltage difference across the two electrodes of the first storage capacitor C1 is equal to Vdata+Vth-ΔVss-Vinit. The voltage of the fourth node N4 is slowly raised during the time duration of compensating the sub-threshold of the driving transistor due to the coupling effect with the voltage of the first power voltage terminal VDD or the initialization signal terminal Init, and the precision of compensating is not affected.

In some implementations, a time duration of an operating level of the second scan signal is longer than a time duration of an operating level of the first scan signal.

In a case where the time duration of the operating level of the second scan signal is longer than the time duration of the operating level of the first scan signal, the time duration of compensating cannot be limited by the second scan signal, so that the time duration of compensating for the threshold of the driving transistor DTFT can be prolonged, the effect of compensating for the threshold is improved, the expectations on compensating for the threshold in the display product with a high refresh rate and a relatively high resolution are met, and the effect of displaying is improved.

In a second aspect, an embodiment of the present disclosure provides a display panel, including the pixel circuit provided in any one of the above embodiments.

Figure 8:
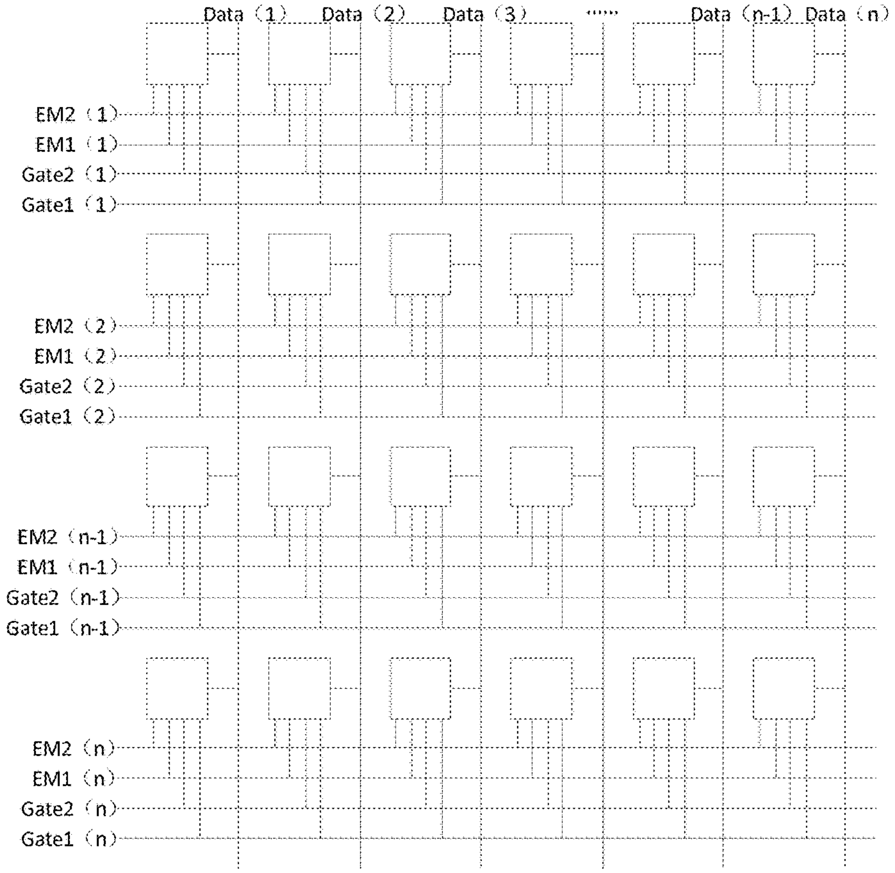
FIG. 8 is a schematic structural diagram of a display panel according to an embodiment of the present disclosure.

FIG. 8 is a schematic structural view of a display panel according to an embodiment of the present disclosure, and as shown in FIG. 8, a plurality of pixel circuits are arranged by rows and columns in an array; for the pixel circuits in an $n^{th}$ row, each first light emitting control sub-circuit 104 is connected to an $n^{th}$ first light emitting control signal line EM1, and each second light emitting control sub-circuit 105 is connected to an $n^{th}$ second light emitting control signal line EM2; n is an integer greater than 1.

Figure 9:
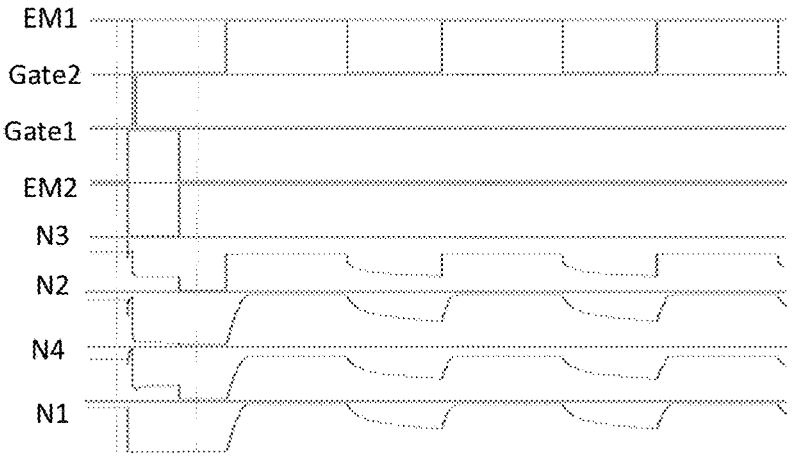
FIG. 9 is a timing diagram of a pixel circuit in the display panel shown in FIG. 8.

In the embodiment of the present disclosure, the pixel circuits in each row are controlled by two light emitting control signal lines, that is, the first light emitting control signal line EM1 and the second light emitting control signal line EM2, by taking the pixel circuit shown in FIG. 1 as an example, the first light emitting control signal and the second light emitting control signal are respectively provided by different gate driver circuits (GOAs), and do not affect each other. The timing diagram of the pixel circuit can be shown in FIG. 9, and the driving process of the pixel circuit can refer to the description of the pixel circuit shown in FIG. 1. The difference is that the first light emitting control signal and the second light emitting control signal shown in FIG. 9 do not affect each other, and the first light emitting control signal can be set to be a pulse signal with a certain period, so that pulse width modulation (PWM) can be performed on the brightness of the light emitting device D, so that the brightness of the light emitting device D in the pixel circuit is more uniform.

Figure 10:
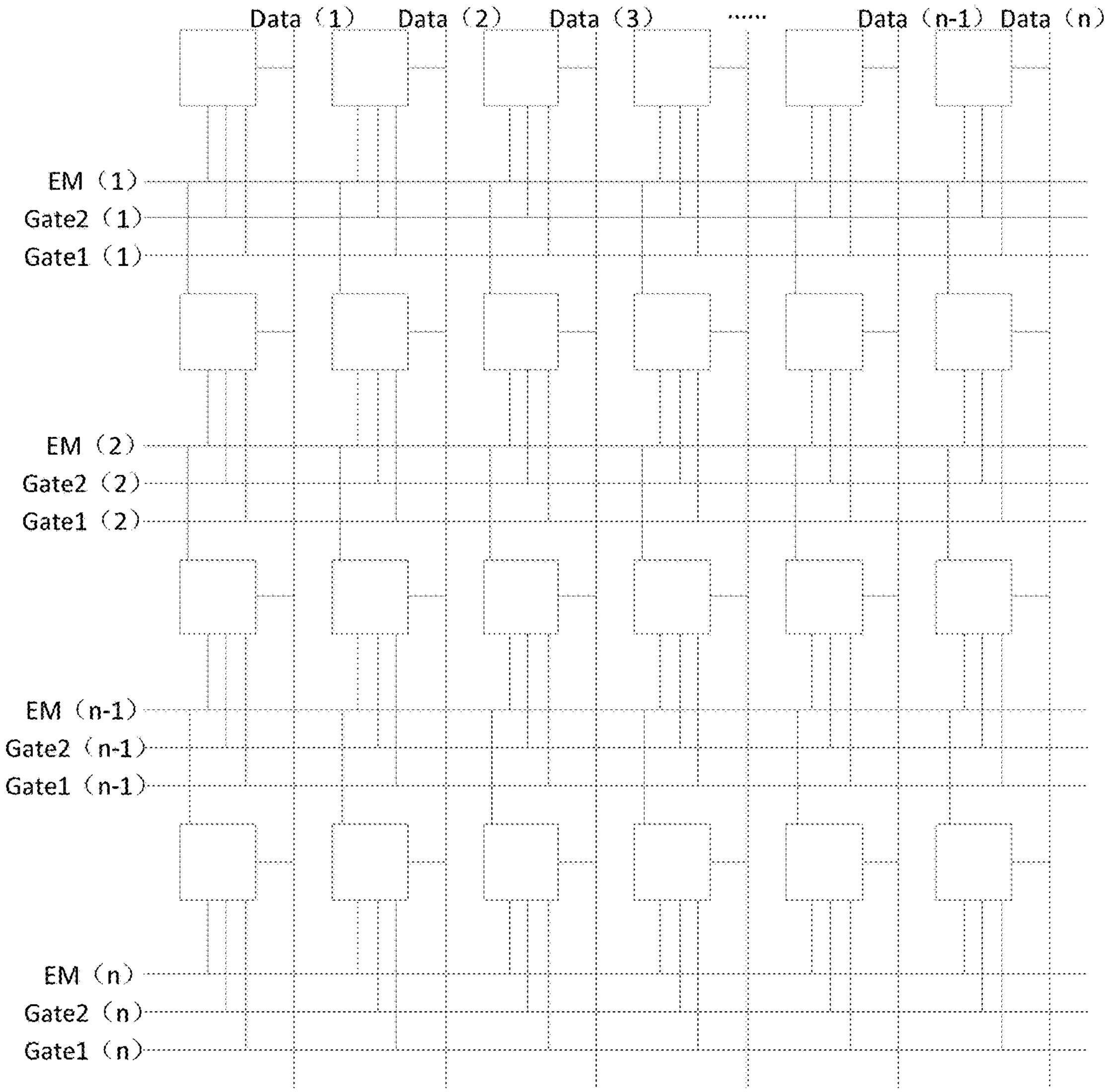
FIG. 10 is a schematic structural diagram of another display panel according to an embodiment of the present disclosure.

FIG. 10 is a schematic structural view of another display panel according to the embodiment of the present disclosure, and as shown in FIG. 10, the $(n-1)^{th}$ first light emitting control signal line EM1 is reused as or common to the $n^{th}$ second light emitting control signal line EM2.

In the embodiment of the present disclosure, the pixel circuits in each row are controlled by one light emitting control signal, that is, EM(1), EM(2), . . . , EM(n-1), or EM(n), the previous first light emitting control signal line EM1 is reused as or common to the current second light emitting control signal line EM2, so that the number of light emitting control signal lines can be reduced, the structure of the circuits is simplified, and the design cost is saved.

In a third aspect, an embodiment of the present disclosure provides a display apparatus, the display apparatus includes the display panel provided in the above embodiment, and the display apparatus may be any product or component with a display function, such as a mobile phone, a tablet computer, a television, a notebook computer, a digital photo frame, and a navigator, and the implementation principle and the beneficial effects of the display apparatus are the same as those of the display panel and the pixel circuit described above, and are not described herein again.

It will be understood that the above embodiments are merely exemplary embodiments employed to illustrate the principles of the present disclosure, and the present disclosure is not limited thereto. It will be apparent to those skilled in the art that various changes and modifications may be made without departing from the spirit and scope of the present disclosure, and these changes and modifications are to be considered within the scope of the present disclosure.

The invention claimed is:

1. A pixel circuit, comprising a reset sub-circuit, a data writing sub-circuit, a threshold compensation sub-circuit, a sub-threshold compensation sub-circuit, a driving transistor, a first storage capacitor, a first light emitting control sub-circuit, a second light emitting control sub-circuit and a light emitting device, wherein the reset sub-circuit is configured to reset a voltage of a first node with an initialization signal in response to a first scan signal, the first node is a connection point between the reset sub-circuit, a first electrode of the light emitting device, an electrode of the first storage capacitor and a second electrode of the driving transistor;

the data writing sub-circuit is configured to write a data signal into a second node in response to a second scan signal, the second node is a connection point between a control electrode of the driving transistor, the threshold compensation sub-circuit and another electrode of the first storage capacitor;

the threshold compensation sub-circuit is configured to write a threshold compensation voltage into a third node in response to the first scan signal to compensate for a threshold of the driving transistor, the third node is a connection point between the threshold compensation sub-circuit, the first electrode of the driving transistor and the first light emitting control sub-circuit;

the sub-threshold compensation sub-circuit is configured to store a voltage of a fourth node and compensate for a sub-threshold of the driving transistor by using the voltage of the fourth node, the fourth node is a connection point between the sub-threshold compensation sub-circuit, the second electrode of the driving transistor, the data writing sub-circuit and the second light emitting control sub-circuit;

the first light emitting control sub-circuit is configured to write a first power voltage into the first electrode of the driving transistor in response to a first light emitting control signal to cause the driving transistor to generate a driving current;

the second light emitting control sub-circuit is configured to transmit the driving current to the light emitting device in response to a second light emitting control signal, so that the light emitting device emits light.

2. The pixel circuit of claim 1, wherein the sub-threshold compensation sub-circuit comprises a second storage capacitor;

an electrode of the second storage capacitor is connected with the fourth node, and another electrode of the second storage capacitor is connected with the second node.

3. The pixel circuit of claim 2, wherein a capacitance of the second storage capacitor is less than a capacitance of the first storage capacitor.

4. The pixel circuit of claim 3, wherein the capacitance of the second storage capacitor ranges from ⅕ to ⅒ of the capacitance of the first storage capacitor.

5. The pixel circuit of claim 1, wherein the sub-threshold compensation sub-circuit comprises a second storage capacitor;

an electrode of the second storage capacitor is connected with the fourth node, and another electrode of the second storage capacitor is connected with a second light emitting control signal line.

6. The pixel circuit of claim 5, wherein a capacitance of the second storage capacitor is less than a capacitance of the first storage capacitor.

7. The pixel circuit of claim 1, wherein the sub-threshold compensation sub-circuit comprises a second storage capacitor;

an electrode of the second storage capacitor is connected with the fourth node, and another electrode of the second storage capacitor is connected with a first power voltage terminal or an initialization signal terminal.

8. The pixel circuit of claim 7, wherein a capacitance of the second storage capacitor is less than a capacitance of the first storage capacitor.

9. The pixel circuit of claim 1, wherein the reset sub-circuit comprises a first transistor, a control electrode of the first transistor is connected with a first scan signal line, a first electrode of the first transistor is connected with an initialization signal terminal, and a second electrode of the first transistor is connected with the first node.

10. The pixel circuit of claim 1, wherein the data writing sub-circuit comprises a second transistor, a control electrode of the second transistor is connected with a second scan signal line, a first electrode of the second transistor is connected with a data signal line, and a second electrode of the second transistor is connected with the fourth node.

11. The pixel circuit of claim 1, wherein the threshold compensation sub-circuit comprises a third transistor, a control electrode of the third transistor is connected with a first scan signal line, a first electrode of the third transistor is connected with the second node, and a second electrode of the third transistor is connected with the third node.

12. The pixel circuit of claim 1, wherein the first light emitting control sub-circuit comprises a fourth transistor, a control electrode of the fourth transistor is connected with a first light emitting control signal line, a first electrode of the fourth transistor is connected with a first power voltage terminal, and a second electrode of the fourth transistor is connected with the third node.

13. The pixel circuit of claim 1, wherein the second light emitting control sub-circuit comprises a fifth transistor, a control electrode of the fifth transistor is connected with a second light emitting control signal line, a first electrode of the fifth transistor is connected with the fourth node, and a second electrode of the fifth transistor is connected with the first node.

14. The pixel circuit of claim 1, wherein a time duration of an operating level of the second scan signal is longer than a time duration of an operating level of the first scan signal.

15. The pixel circuit of claim 1, wherein a falling edge of the second scan signal is staggered from a rising edge of the second light emitting control signal.

16. A display panel, comprising a plurality of pixel circuits, wherein the pixel circuits comprise the pixel circuit of claim 13.

17. The display panel of claim 16, wherein the pixel circuits are arranged in an array, and for the pixel circuits in an nth row, each first light emitting control sub-circuit is connected with an $n^{th}$ first light emitting control signal line, and each second light emitting control sub-circuit is connected with an $n^{th}$ second light emitting control signal line, n is an integer greater than 1.

18. The display panel of claim 17, wherein the $(n-1)^{th}$ first light emitting control signal line is reused as the nth second light emitting control signal line.

19. A display apparatus, comprising the display panel of claim 17.

20. A display apparatus, comprising the display panel of claim 16.

* * * * *